United States Patent Office 3,671,151
Patented June 20, 1972

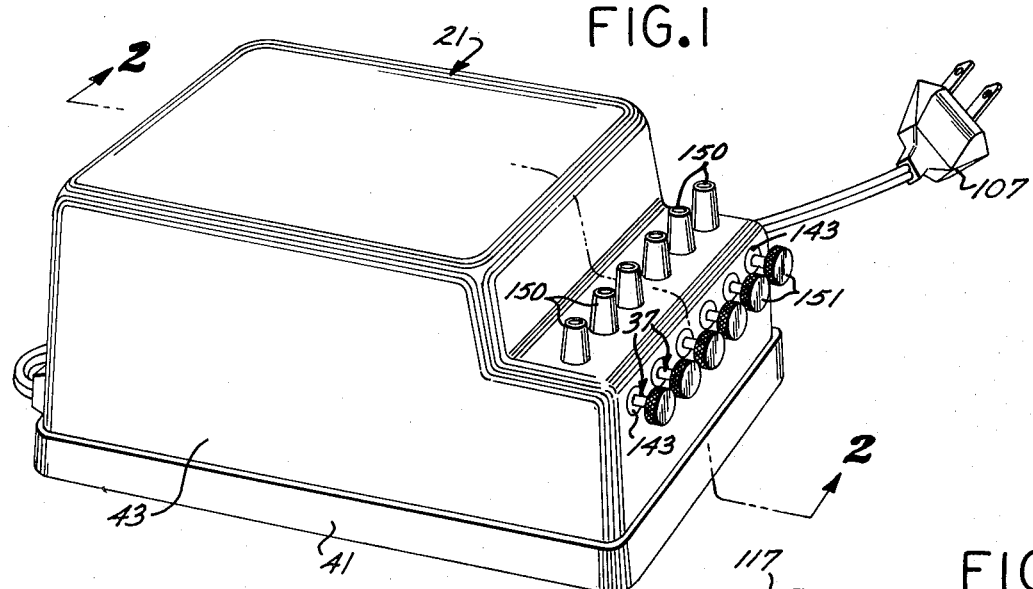
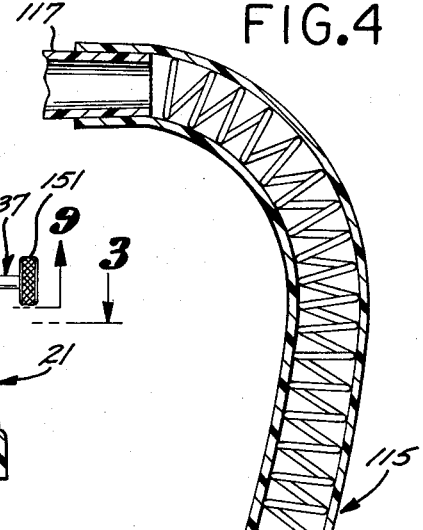
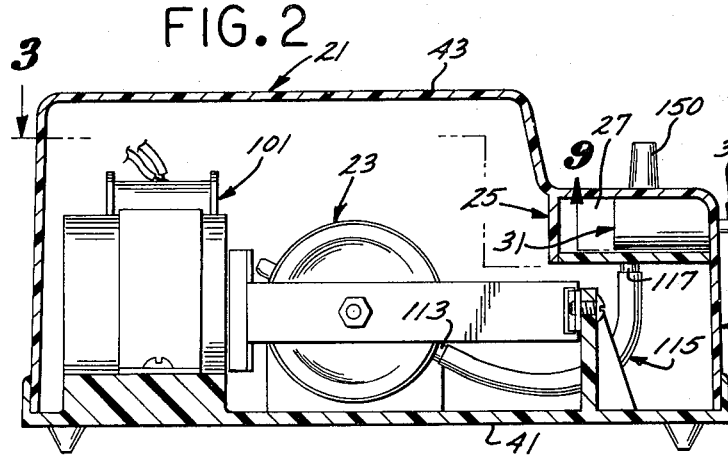
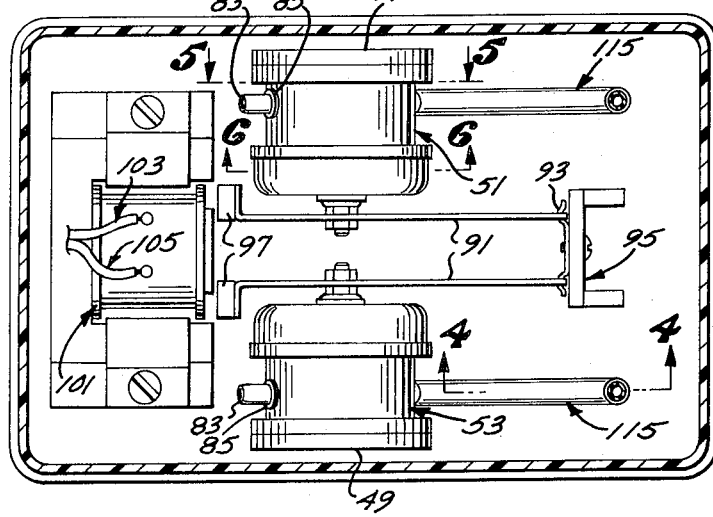
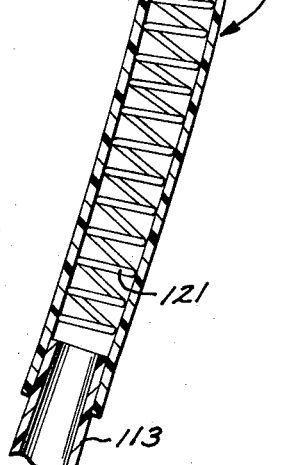
INVENTORS.
DAVID Z. LEVINSOHN
BERNARD DUKE
BY Fulwider, Patton, Rieber, Lee and Utecht
ATTORNEYS

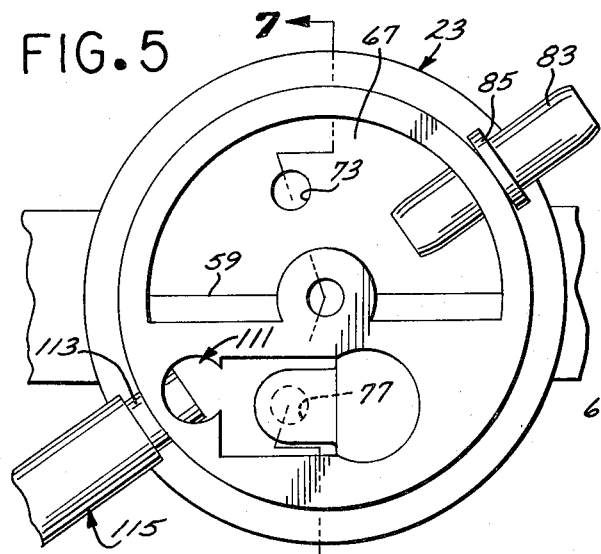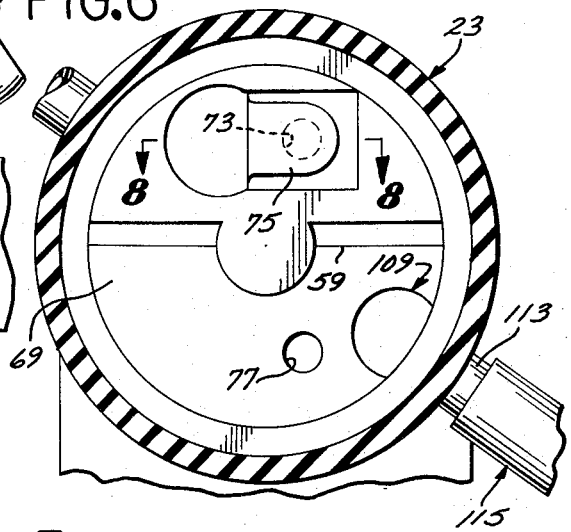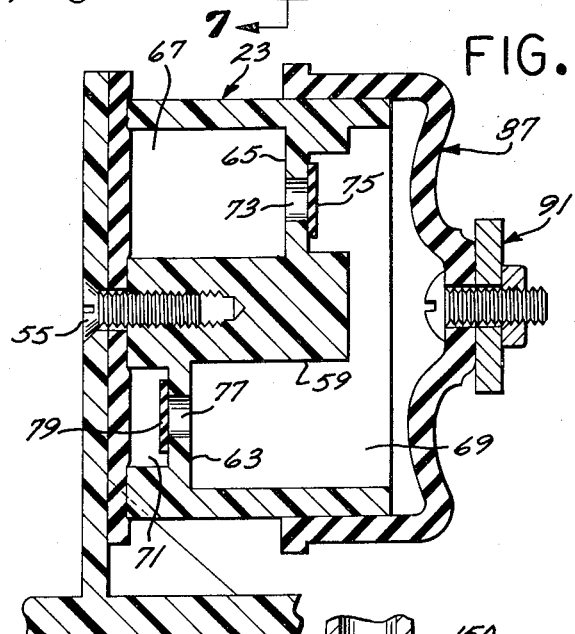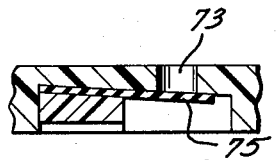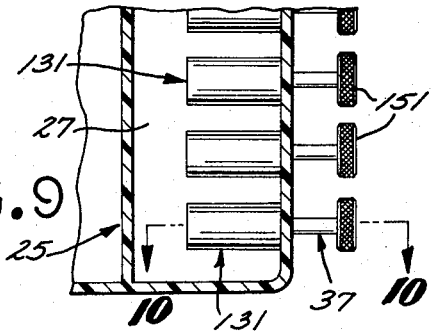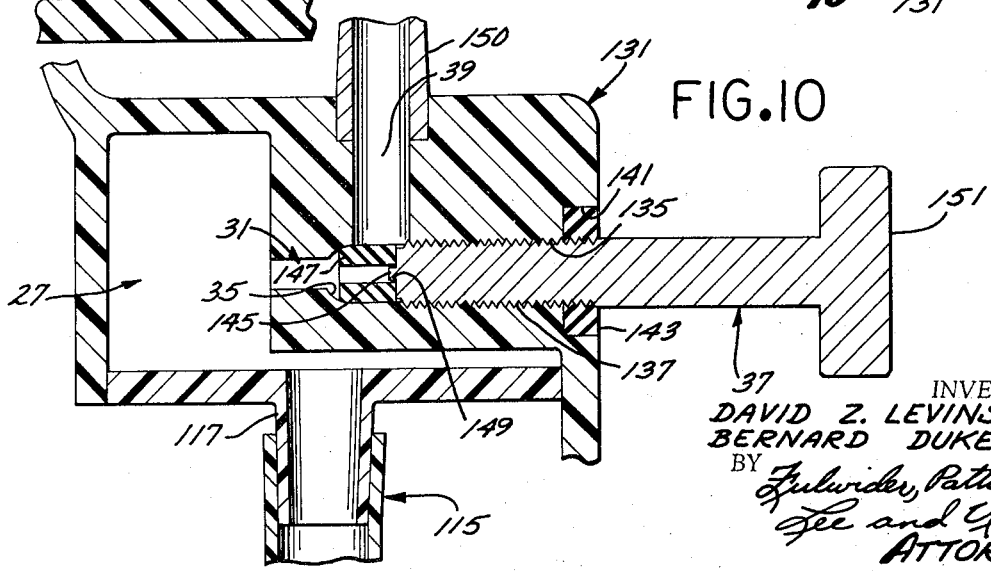

---

3,671,151
COMBINATION AQUARIUM PUMP AND GANG VALVE
Bernard Duke, Deal, N.J., and David Z. Levensohn, New York, N.Y., assignors to Miracle Pet Products, Inc., Jersey City, N.J.
Filed May 11, 1970, Ser. No. 35,988
Int. Cl. F04b 17/00, 35/04; F10l 11/00; F16k 31/44
U.S. Cl. 417—411                                        4 Claims

ABSTRACT OF THE DISCLOSURE

A housing having a pump mounted therein and including a valve manifold having an inlet chamber with a plurality of stem-receiving bores in communication therewith, and outlet ports extending transversely thereof. The bores are formed with valve seats interposed between the inlet chamber and respective outlet ports and include threaded sections. Valve stems are inserted in the respective bores and are threaded for engagement with said threaded sections whereby the combination pump and valve may be installed as a unit to provide air at selected flow rates from the respective outlet ports.

BACKGROUND OF THE INVENTION

Field of the invention

The present invention relates to an air pump and valving combination for fish aquariums.

Description of the prior art

It has been common practice to provide aquarium pumps which have individual outlets from each pump and valving systems are provided separately from the pump for receiving air therefrom for distribution between as many different elements as are to be served by the pump. Arrangements of this type suffer the shortcoming of providing a rather cumbersome arrangement which is frequently unsightly in appearance because of the numerous tubes required for connecting the pumps and valves together.

SUMMARY OF THE INVENTION

The present invention is characterized by a combination aquarium pump and gang valve which includes a housing having a pump supported therein. The housing is formed with a valve manifold including an inlet chamber in communication with a plurality of stem-receiving bores which form respective valve seats. Stems are inserted in the bores to control flow through respective outlet ports.

An object of the present invention is to provide a compact combination aquarium pump and gang valve arrangement which is convenient to install and use.

Another object of the present invention is to provide a combination of the type described wherein the gang valve includes means for preventing accidental opening or closing of the respective valves due to vibration.

Another object of the present invention is to provide the combination described wherein the pump means is relatively quiet.

Objects and the advantages of the present invention will become apparent from a consideration of the following detailed description when taken in conjunction with the accompanying drawings.

DESCRIPTION OF THE DRAWINGS

FIG. 1 is a perspective view of a combination aquarium pump and gang valve embodying the present invention;

FIG. 2 is a vertical sectional view taken along the line 2—2 of FIG. 1;

FIG. 3 is a horizontal sectional view taken along the line 3—3 of FIG. 2;

FIG. 4 is a vertical sectional view, in enlarged scale, taken along the line 4—4 of FIG. 3;

FIG. 5 is a vertical sectional view, in enlarged scale, taken along the line 5—5 of FIG. 3;

FIG. 6 is a vertical sectional view, in enlarged scale, taken along the line 6—6 of FIG. 3;

FIG. 7 is a sectional view taken along the line 7—7 of FIG. 5;

FIG. 8 is a horizontal sectional view taken along the line 8—8 of FIG. 6;

FIG. 9 is a horizontal sectional view taken along the line 9—9 of FIG. 2; and

FIG. 10 is a vertical sectional view, in enlarged scale, taken along the line 10—10 of FIG. 9.

DESCRIPTION OF THE PREFERRED EMBODIMENT

Referring to FIGS. 2, 9 and 10, the combination aquarium pump and gang valve apparatus of present invention includes, generally, a housing 21 which mounts a pair of vibrator pumps 23 and is formed with a gang valve manifold 25 which includes an intake manifold 27 having a plurality of stem-receiving bores 31 in communication therewith. Referring to FIG. 10, the stem-receiving bores 31 are formed intermediately with respective reduced-in-diameter valve seats 35 and respective valve stems 37 are received therein and cooperate with such seats to control communication between the inlet chamber 27 and respective outlet ports 39. Thus, the pump 23 and gang valve arrangement are incorporated as a compact and attractive unit to provide air pressure for a plurality of aquarium functions without the necessity of providing separate pumps for each function or providing an auxiliary gang valve arrangement which must be supported separately from the pump and connected therewith by air tubes which tend to twist and tangle thereby presenting an unsightly appearance.

The housing 21 includes a base 41 on which the pumps 23 are mounted and a cover 43 which forms the gang valve manifold 25. Referring to FIG. 3, the base 41 includes a pair of spaced-apart upwardly projecting flanges 47 and 49 which have respective cylindrical pump housings, generally designated 51 and 53, mounted thereon by means of axial mounting screws 55 (FIG. 7). Referring to FIGS. 5, 6 and 7, the cylindrical pump housings 51 and 53 are each formed with a horizontal, axially extending partition 59 having a pair of off-set semi-circular, vertical partitions 63 and 65 (FIG. 7) projecting from opposite sides thereof to cooperatively form an inlet chamber 67, intermediate pumping chamber 69 and an outlet chamber 71. An inlet bore 73 leads from the inlet chamber 67 to the pumping chamber 69 and is normally covered by a flap 75 and an outlet bore 77 leads from the pumping chamber 69 to the outlet chamber 73 and is normally covered by a resilient flap 79. Referring to FIG. 5, the wall of the inlet chamber 67 is formed by a bore and a muffler tube 83 is press-fit thereinto and includes a collar 85 to limit the distance which it is inserted.

With continued reference to FIG. 7, the open end of each of the pumping chambers 69 is covered by a cup-shaped flexible diaphragm 87 which has its central portion connected to the intermediate portion of a drive arm 91 which is pivotally carried at its rear extremity from a mounting clip 93 (FIG. 3) carried on a mounting bracket 95. Still referring to FIG. 3, the free ends of the drive arms 91 are turned outwardly and mount respective armatures 97 which are disposed in electrically inductive relationship with a coil, generally designated 101, having power supplied thereto by a pair of electric leads 103 and 105 which are connected with an electrical plug 107 (FIG. 1).

Referring to FIG. 6, a boss 109 extends axially into the pumping chamber 69 and is formed with an open-ended axial bore 111 (FIG. 5) leading from the outlet chamber 71 and has a bore extending radially therefrom for receiving a tube insert 113 which is cemented in place and has one end of a thin-walled outlet tube, generally designated 115, connected therewith. The opposite ends of outlet tubes 115 are connected with nipples 117 (FIG. 2) forming the inlets to the inlet chamber 27 of the valve manifold 25. Referring to FIG. 4, coil springs 121 are inserted in the respective tubes 115 to enable such tubes to be flexed to a configuration accommodating the path between the outlet of the pump 23 and the inlet to the valve manifold 25 without collapse of such tubes.

Referring to FIGS. 9 and 10, the gang valve manifold 25 is formed with a plurality of cylindrical valve bodies, generally designated 131, which project into the intake chamber 27 and are formed with the stem-receiving bores 31 and the transversely extending outlet ports 39. The outer length 135 of each of the bores 31 is internally threaded for receiving the external threads 137 of the respective valve stems 37. A concentric countersunk cavity 141 is formed around the open end of the bore 31 and receives a resilient grommet 143 through which the stem 37 is projected to thereby frictionally resist turning of such stem. The stem 37 is formed on its inner end with an axially projecting peg 145 which is received in a bore 149 formed in a resilient cylindrical poppet 147. The outer end of the stem 37 is formed with a knurled, enlarged-in-diameter, head 151 for being grasped to turn the respective stems. Delivery nipples 150 are mounted from the respective valve bodies 131 to provide means for connecting delivery tubes to the respective outlet ports 39.

In operation, the combination pump and gang valve apparatus of present invention is placed adjacent the aquarium to be serviced thereby and communication tubes have their respective one ends connected with the respective outlet nipples 150 and their opposite ends connected with the individual elements to be operated, such as air operated novelties and filtration devices. The coil 101 is then plugged into an AC source to provide a fluctuating magnetic field in the area of the armatures 97 to effect oscillation thereof to drive the free ends of the arms 91 and flex the pump diaphragm 87 inwardly and outwardly to effect sequential cycling to pressurize and partially evacuate the intermediate pump chambers 69 (FIG. 7). On outward flexing of the diaphragm 87 the volume of the chamber 69 is expanded to create a partial vacuum thereby pulling the tab 79 into sealing engagement with the outlet port 77 and lifting the tab 75 off the inlet port 73 to draw air in from the inlet chamber 67. When the diaphragm 87 is flexed inwardly the pump chamber 69 is pressurized to press the flap 75 into sealing engagement over the inlet port 73 and the flap 79 is lifted off the outlet port 77 and pressurized air forced therethrough, and into the outlet chamber 71. Air from the outlet chamber 71 is communicated through the transverse bore 111 to the outlet tube insert 113 and respective nipples 117 forming the inlets to the inlet chamber 27 of the gang valve manifold 25. The muffler tubes 83 have been found to ve very effective in muffling the operational noise of the pumps 23 to provide for quiet operation. The pressure will be supplied to the inner ends of the stem-receiving bores 31 and may be distributed by adjusting the stems 37 relative to the respective poppets 147.

From the foregoing detailed description it will be evident that the unitized combination aquarium pump and gang valve of present invention provides a convenient package for pumping and distributing air to a plurality of elements. The unit is relatively quiet in operation and the respective valve adjustments will be maintained irrespective of vibration resulting from pump operation.

Various modifications and changes may be made with regard to the foregoing detailed description without departing from the spirit of the invention.

We claim:
1. A combination aquarium pump and gang valve, comprising:
   a housing formed with a valve manifold including an inlet chamber and a plurality of stem-receiving bores in communication therewith, said respective bores being formed with valve seats and threaded sections, said housing further including outlet ports leading from said respective stem bores;
   a pair of vibrator pumps mounted side-by-side in said housing and each including a flexible diaphragm which is flexed to force air out of its respective pump, said diaphragms facing one another;
   a pair of aligned drive arms mounted at one of their ends in said housing between said diaphragms and each having its intermediate portions affixed to one of said diaphrams, and with the ends of said drive arms opposite said one end being formed with an armature;
   a single electric coil in said housing disposed adjacent said armatures in electrically inductive relationship therewith whereby said single coil will drive the armature-carrying ends of said coil back and forth to thereby sequentially flex said diaphrams;
   conduit means connecting said pump means with said inlet chamber; and
   valve stems for insertion in said bores and formed with externally threaded portions for engaging said threaded sections whereby said stems may be individually adjusted in said bores to cooperate with the respective seats to provide the desired flow rates from the respective outlet ports.
2. An aquarium pump and gang valve combination as set forth in claim 1 that includes:
   resilient poppets secured to the respective stems for engagement with said respective seats.
3. An aquarium pump and gang valve combination as set forth in claim 1 that includes:
   rubber grommets mounted in said housing and encircling said stems for frictionally resisting turning thereof.
4. An aquarium pump and gang valve combination as set forth in claim 3 wherein said conduit means includes thin-walled flexible tubes within which are disposed coil springs to prevent collapse of such tubes.

References Cited

UNITED STATES PATENTS

| | | | |
|---|---|---|---|
| 2,788,170 | 4/1957 | Kato et al. | 417—413 |
| 3,092,141 | 6/1963 | Stark | 137—608 |
| 3,443,579 | 5/1969 | Doolittle | 251—214 |
| 2,593,316 | 4/1952 | Kraft | 417—540 |
| 2,949,133 | 8/1960 | Rothermel et al. | 138—133 X |

ROBERT M. WALKER, Primary Examiner

U.S. Cl. X.R.

138—133; 137—608; 251—214; 417—413, 540